2 Sheets--Sheet 1.

R. B. SHELDON.

Seed-Drills.

No. 6,124.

Reissued Nov. 10, 1874.

Witnesses:
H. H. Dodge
W. E. Chaffee

Inventor:
R. B. Sheldon
By his attys.
Dodge & Son

THE GRAPHIC CO. PHOTO-LITH. 39 & 41 PARK PLACE, N.Y.

2 Sheets--Sheet 2.

R. B. SHELDON.

Seed-Drills.

No. 6,124. Reissued Nov. 10, 1874.

WITNESSES:
H. H. Dodge
W. C. Chuffe

INVENTOR:
R. B. Sheldon
By his attys.
Dodge & Son

THE GRAPHIC CO. PHOTO-LITH. 39 & 41 PARK PLACE, N.Y.

UNITED STATES PATENT OFFICE.

RICHARD B. SHELDON, OF SHORTSVILLE, NEW YORK, ASSIGNOR TO P. P. MAST & CO., OF SPRINGFIELD, OHIO.

IMPROVEMENT IN SEED-DRILLS.

Specification forming part of Letters Patent No. 118,821, dated September 12, 1871; reissue No. 6,124, dated November 10, 1874; application filed August 19, 1874.

*To all whom it may concern:*

Figure 1:
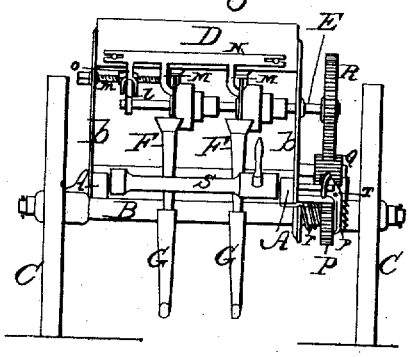
Figure 2:
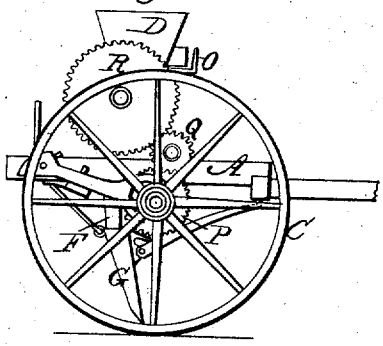
Figure 3:
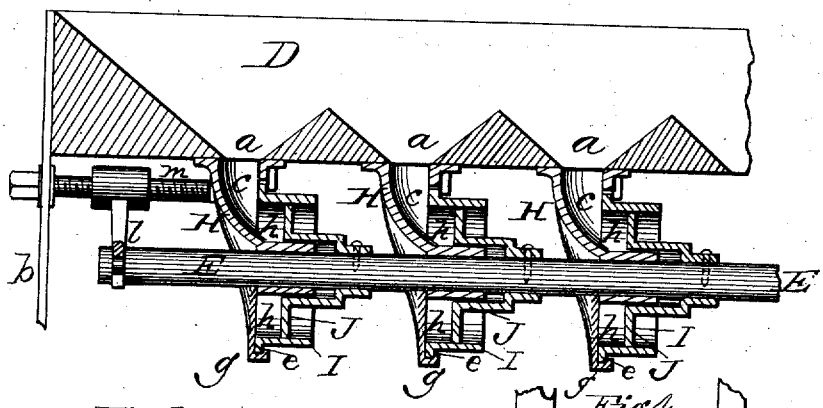

Be it known that I, RICHARD B. SHELDON, formerly of Canastota, Madison county, New York, now of Shortsville, Ontario county, New York, have invented certain Improvements in Grain-Drills, of which the following is a specification:

Figure 1 represents a rear elevation of the machine; Fig. 2, an end elevation of the same; Fig. 3, a vertical central section through the seed-hopper and the seed delivering or feeding mechanism; Figs. 4, 5, 6, 7, and 8, views of various details.

The invention relates mainly to the construction and arrangement of the seed delivering or feeding mechanism, in order to permit the rate of feed to be increased or diminished readily, and without changing the speed of the mechanism. The invention consists in the combination, with a feed cup or case, of a vertical laterally-adjustable feed wheel or disk, arranged in such manner that the grain passes between the vertical faces of the cup and wheel, and that, by moving the wheel laterally, the width of the seed passage or throat may be varied, so as to increase or diminish the rate of feed. The invention also consists in the peculiar form and arrangement of the feed-cup, in the combination of a series of slides with the adjustable feed-wheels, and in a novel arrangement of mechanism for transmitting motion from the driving-wheel to the feed-shaft.

In the drawings, A represents a rigid rectangular frame, mounted on an axle, B, the ends of which are supported in two wheels, C, as shown. D represents the seed-box or hopper, arranged transversely above the frame, and supported by two standards, *b*, secured to the axle B, as shown in Fig. 1. E is a horizontal shaft, carrying the feed-wheels, mounted under the hopper in the standards *b*, and rotated by gearing connecting with one of the driving-wheels C, as hereinafter explained.

Figure 5:
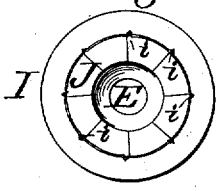

The bottom of the hopper D is provided at regular intervals with small openings *a*, to allow the discharge of the grain, and under each of said openings there is arranged a feeding device to deliver the grain into the usual spout or conductor F, leading into the drill tube or tooth G, as shown in Figs. 1 and 2. Each feeding device consists of a feed cup, case, or shell, H, secured to the under side of the hopper, a cylinder or rim, I, at the side of the cup, and a vertical feed wheel or disk, J, secured upon the shaft E within the outer end of the cylinder, as shown in Fig. 3. The cup or case extends downward around the shaft E, and is provided with a front throat or passage, *c*, to conduct the seed into the cylinder. At its rear edge the cup or case is cut away, as shown at *d*, Figs. 7 and 8, to permit the escape of the seed from the cylinder. The inner end of the cylinder is provided with an external flange, *e*, which engages under lugs *g* on the cup, and holds the cylinder up in place, the cylinder being left free to rotate, but prevented from moving endwise. The vertical feed wheel or disk is secured firmly on the shaft E, within the end of the cylinder, as shown in Fig. 3, so that a space, *h*, is left between the vertical faces of the cup and wheel, to permit the passage of the seed from the inlet-throat *c* around to the outlet-opening *d*. The outer edge of the feed-wheel is provided with projections *i*, which enter corresponding grooves made lengthwise in the interior of the cylinder, as shown in Fig. 5, so that as the wheel rotates it turns the cylinder, while at the same time the grooves permit the wheel to be moved laterally in the cylinder. By the lateral movement of the wheel, the width of the throat or passage *h* may be increased or diminished, and the width of that part of the rim or cylinder I which carries the grain along is also varied at will, and thus the rate of feed increased or diminished without changing the speed of the wheel.

It will thus be seen that the rate of feed is regulated by two means: first, the varying width of the throat or space between the case H and the disk J; and, second, by varying the width, and consequently the carrying capacity, of the horizontal rim flange or cylinder I, which carries the grain along, and feeds it out of the cup or case.

The shaft E, on which the wheels are rigidly secured, is movable endwise, so that by simply moving the shaft the entire series of feed-wheels may be moved simultaneously and equally. The end of the shaft is provided with a circumferential groove, and mounted in the end of an arm, *l*, which is carried by a stationary screw, *m*, at the end of the hopper, as shown in Figs. 1 and 3, so that by turning the screw the feed of all the cups may be varied with the greatest nicety.

Figure 8:
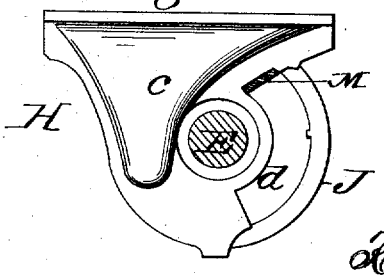

To prevent the grain from flowing over backward in the cylinder, and escaping directly through the discharge-opening, a sliding stop or cut-off, M, is mounted in each cup or case, and extends inward across the passage *h*, to the face of the wheel or disk, as shown in Figs. 1 and 8. This slide prevents the grain from reaching the outlet, except by passing around under the shaft in the proper manner. As the wheel is moved inward and outward, the slide is moved to correspond, so as to remain in contact therewith. The slides M are all connected to a sliding bar, N, having an arm, *o*, which engages with the arm *l*, which moves the shaft E, so that when the screw *m* is turned it operates both the wheels and the cut-off slides.

The position of the feed wheels or disks and the amount of grain being sown per acre are indicated by an index, O, located on the bottom and front of the hopper, as shown in Fig. 2. This indicator is operated by the adjusting-arm *l*, the indicator having a fixed fulcrum on the hopper, and having its inner end connected to the arm *l*. The indicator may be attached rigidly to the arm *l*; but by pivoting its inner end near the arm the movement of the latter is exaggerated by the outer end of the indicator, so that small movements of the arm are clearly shown by the indicator.

Figure 4:
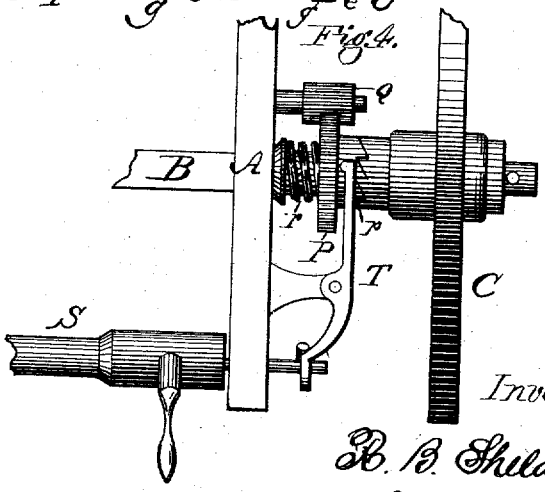
Figure 6:
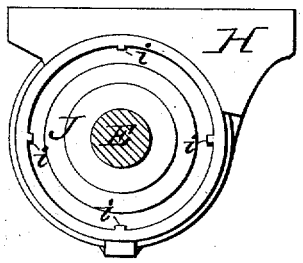
Figure 7:
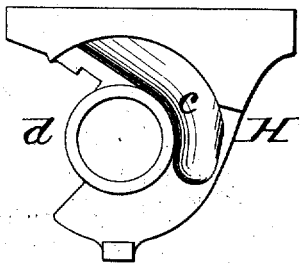

The arrangement and connection of the driving mechanism are clearly shown in Figs. 1 and 4. On the axle B there is mounted a gear-wheel, P, free to rotate and to slide laterally on the axle. This wheel is provided on the outer side with a ratchet-clutch, *p*, which engages with a corresponding clutch on the inside of one of the driving-wheels C, the gear-wheel being forced outward, to keep the clutches in contact, by a spiral spring, *r*, bearing against its inner side, as in Fig. 4. The wheel P gears into a pinion, Q, mounted on the side of the main frame, and the pinion Q, in turn, gears into a wheel, R, secured on the end of the feed-shaft E, as clearly shown, so that a rotary motion is transmitted to said shaft from the driving-wheel C. The intermediate pinion or idler Q is made of such length that the wheel on the feed-shaft will not be disengaged by the end play of the shaft. On the side of the frame there is pivoted a lever, R, one end of which bears against the outer side of the wheel P, while its other end is mounted on the end of the rock-shaft or windlass S, by which the drill-teeth are raised, said shaft being provided with an arm or cam, *t*, which operates the lever R and throws the wheel P out of gear when the shaft S is turned to raise the teeth.

When the shaft S is turned to lower the teeth the lever R is released, and the spring *r* again throws the wheel P in gear with the clutch.

By using the long pinion between the two laterally-moving wheels the gearing remains always in connection, so that it starts and runs smoothly and without danger of breakage.

Having described my invention, what I claim is—

1. In a force-feed for grain-drills, the combination of a stationary cup or case, a side rim or cylinder, and a vertical laterally-adjustable feed wheel or disk within the rim or cylinder, substantially as shown, the grain passing between the vertical faces of the cup and wheel, and being discharged in a continuous stream.

2. The combination of the cup or case H, having the throat *c* and the vertical inside face, the rim or cylinder I at the side of the cup, and the vertical laterally-adjustable feed wheel or disk J, arranged in the outer end of the rim or cylinder to revolve with it, as shown.

3. The combination of the cup or case H, the cylinder I, provided with the internal grooves, and the vertical feed-wheel provided with the projections *i*, and mounted in the cylinder, as shown.

4. In combination with the cup or case, the rim or cylinder at its side, and the laterally-moving wheel or disk, the cut-off slide M, arranged as shown.

5. In combination with the movable shaft E, having the series of feed-wheels secured thereon, the bar N, provided with the series of cut-off slides M, and connected to the shaft E so as to move therewith, in order to move the entire series of wheels and slides simultaneously and uniformly.

6. In a grain drill, a vertical laterally-adjustable feed-wheel, in combination with a feed-cup, arranged to operate substantially as described, so that the grain will feed in a continuous stream between the vertical walls of the wheel and the cup, and so, also, that the rate of feed may be varied by moving the wheel laterally without changing its speed.

7. The shaft E, provided with a series of laterally-adjustable vertical feed-wheels, and a gear-wheel, P, in combination with the elongated pinion Q, whereby the feed-wheels can be adjusted laterally to vary the rate of feed without disconnecting or changing the driving-gear, as set forth.

8. The combination of a feed cup or case, a laterally-adjustable feed-wheel, and a cut-off or slide, M, arranged to be moved or adjusted with the feed-wheel, substantially as and for the purpose set forth.

9. In a feed for grain-drills, a vertical feed-wheel having a laterally-projecting rim, the carrying-face of which may be varied in width, substantially as described.

And, in testimony that I claim such to be my invention, I have hereunto set my hand this 27th day of July, 1874.

RICHARD B. SHELDON.

In the presence of—

BUD HARLEM,

S. G. PETTITT.